US008620610B2

(12) United States Patent
Bageshwar et al.

(10) Patent No.: US 8,620,610 B2
(45) Date of Patent: Dec. 31, 2013

(54) CRANE JIB ATTITUDE AND HEADING REFERENCE SYSTEM AND METHOD

(75) Inventors: Vibhor L. Bageshwar, Minneapolis, MN (US); Michael Ray Elgersma, Plymouth, MN (US); Brian E. Fly, Clearwater, FL (US); Steven P. Cienciwa, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 476 days.

(21) Appl. No.: 13/049,624

(22) Filed: Mar. 16, 2011

(65) Prior Publication Data

US 2012/0239331 A1 Sep. 20, 2012

(51) Int. Cl.
*G06F 19/00* (2011.01)

(52) U.S. Cl.
CPC .................................. *G06F 19/00* (2013.01)
USPC ................................................ 702/92

(58) Field of Classification Search
USPC ........................ 702/92, 150, 152, 182–185
See application file for complete search history.

(56) References Cited

U.S. PATENT DOCUMENTS

| | | | | |
|---|---|---|---|---|
| 5,961,563 | A | 10/1999 | Overton | |
| 7,367,464 | B1 | 5/2008 | Agostini et al. | |
| 2007/0219662 | A1 | 9/2007 | Sawodny et al. | |
| 2007/0255494 | A1 * | 11/2007 | Politick et al. | 701/213 |

FOREIGN PATENT DOCUMENTS

| | | | |
|---|---|---|---|
| FR | 2670195 | A1 | 6/1992 |
| JP | 07144883 | | 6/1995 |

OTHER PUBLICATIONS

EP search report, EP 12158957.6-1256 dated May 6, 2012.

* cited by examiner

*Primary Examiner* — Edward Raymond
(74) *Attorney, Agent, or Firm* — Ingrassia Fisher & Lorenz, P.C.

(57) ABSTRACT

Methods and apparatus are provided for determining the attitude and heading angle of a crane jib. Crane jib angular velocity, crane jib roll angle, crane jib pitch angle, crane jib specific force, and magnetic field in the local operating environment of the crane jib are all sensed and supplied to a processor. All of these measurements are processed, in a processor, to estimate the attitude and heading angle of the crane jib.

20 Claims, 4 Drawing Sheets

CRANE JIB ATTITUDE AND HEADING REFERENCE SYSTEM AND METHOD

TECHNICAL FIELD

The present invention generally relates to an attitude and heading reference system, and more particularly relates to an attitude and heading reference system for the jib of a crane.

BACKGROUND

Tower cranes are used in myriad environments. Two of the more common environments are construction sites and ship-building facilities, because of the combination of height and lifting capacity this type of crane provides. A tower crane typically includes a base, a mast, and a crane jib. The base is fixed to the ground, and is also connected to the mast. A slewing unit is connected to the mast and is used to rotate the crane. The crane jib includes, among other things, a load-bearing section, a counter jib section, and the operator cab.

The load-bearing section of the crane jib typically carries a load. The counter jib section is connected to the load-bearing section, and carries a counterweight to balance the crane jib while the load-bearing section is carrying a load. The operator cab is usually located near the top of the mast, and may be attached to the crane jib. However, other tower cranes may have the operator cab mounted partway down the mast. No matter its specific location, a crane operator sits in the operator cab and controls the crane. In some instances, a crane operator can remotely control one or more tower cranes from the ground.

In some environments, a plurality of tower cranes may be operated in relatively close proximity. Thus, while it is unlikely, it has been postulated that the crane jibs of two or more tower cranes could collide. Hence, there is a need for a collision avoidance/warning system that is able to determine the three-dimensional (3D) angular orientation (e.g., attitude and heading angle) of a crane's own crane jib and of other crane jibs working at a particular site. The present invention addresses at least this need.

BRIEF SUMMARY

In one embodiment, a method of determining the attitude and heading angle of a crane jib includes sensing crane jib angular velocity, sensing crane jib roll angle, sensing crane jib pitch angle, sensing specific force acting on a portion of the crane jib, and sensing local magnetic field at least proximate the crane jib. The sensed crane jib angular velocity, the sensed crane jib roll angle, the sensed crane jib pitch angle, the sensed specific force, and the sensed local magnetic field are all supplied to a processor. In the processor, crane jib translational velocity is computed from the sensed crane jib angular velocity and the sensed specific force, and crane jib acceleration is computed using the computed crane jib translational velocity and the sensed crane jib angular velocity. The computed crane jib acceleration is used to remove crane jib acceleration components from the sensed crane jib roll angle and the sensed crane jib pitch angle, and to thereby supply corrected crane jib roll angle measurements and corrected crane jib pitch angle measurements. Calibration parameters are applied to the sensed local magnetic field, to thereby supply calibrated magnetic field measurements. Crane jib heading angle is computed from the calibrated magnetic field measurements. The corrected crane jib roll angle measurements, the corrected crane jib pitch angle measurements, and the computed crane jib heading angle, are used to estimate the attitude and heading angle of the crane jib.

In another embodiment, a crane jib attitude and heading reference system includes a plurality of crane jib angular velocity sensors, a plurality of specific force sensors, an inclinometer, a plurality of magnetometers, and a processor. Each crane jib angular velocity sensor is configured to sense crane jib angular velocity and supply angular velocity signals representative thereof. Each specific force sensor is configured to sense specific forces acting on the crane jib and supply specific force sensor signals representative thereof. The inclinometer is configured to sense crane jib roll angle and crane jib pitch angle and supply inclinometer signals representative thereof. Each magnetometer is configured to sense local magnetic field at least proximate the crane jib and supply magnetometer signals representative thereof. The processor is coupled to receive the angular velocity signals, the specific force sensor signals, the inclinometer signals, and the magnetometer signals and is configured, in response thereto, to compute crane jib translational velocity from the sensed crane jib angular velocities and the sensed specific forces, compute crane jib acceleration using the computed crane jib translational velocity and the sensed crane jib angular velocities, use the computed crane jib acceleration to remove crane jib acceleration components from the sensed crane jib roll angle and the sensed crane jib pitch angle, and to thereby supply corrected crane jib roll angle measurements and corrected crane jib pitch angle measurements, apply calibration parameters to the sensed local magnetic fields, to thereby supply calibrated magnetic field measurements, compute crane jib heading angle from the calibrated magnetic field measurements, and using the corrected crane jib roll angle measurements, the corrected crane jib pitch angle measurements, and the computed crane jib heading angle, to estimate the attitude and heading angle of the crane jib.

In yet another embodiment, a crane jib attitude and heading reference system includes a plurality of crane jib angular velocity sensors, an inclinometer, a plurality of accelerometers, a plurality of magnetometers, a display device, and a processor. Each crane jib angular velocity sensor is configured to sense crane jib angular velocity and supply angular velocity signals representative thereof. The inclinometer is configured to sense crane jib roll angle and crane jib pitch angle and supply inclinometer signals representative thereof. Each accelerometer is configured to sense forces acting on a proof mass and supply specific force sensor signals representative thereof. Each magnetometer is configured to sense local magnetic field at least proximate the crane jib and supply magnetometer signals representative thereof. The processor is coupled to the display device and further coupled to receive the angular velocity signals, the inclinometer signals, the specific force signals, and the magnetometer signals. The processor is configured, upon receipt of the angular velocity signals, the inclinometer signals, the specific force signals, and the magnetometer signals, to compute corrected accelerometer measurements using the sensed forces acting on the proof mass, gravity, and predictions of accelerometer bias, compute corrected angular velocity measurements using the sensed angular velocity and predictions of angular velocity sensor bias, compute estimates of crane jib translational velocity using the corrected angular velocity measurements, compute corrected crane jib roll and pitch angles from the inclinometer signals and the estimates of crane jib translational velocity, compute crane jib heading angle from the magnetometer signals, implement a first filter that receives the computed estimates of crane jib velocity, computes predictions of crane jib velocity, and computes the predictions of accelerometer bias, implement a second filter that receives the computations of corrected crane jib roll and pitch angles and the computations of crane jib heading angle, computes the predictions of angular velocity sensor bias, and determines crane jib attitude and heading angle, and supplies image rendering display commands to the display device that cause the display device to render the crane jib attitude and heading angle thereon.

Furthermore, other desirable features and characteristics of the crane jib attitude and heading system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word “exemplary” means “serving as an example, instance, or illustration.” Thus, any embodiment described herein as “exemplary” is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although the attitude and heading reference system is described herein as being implemented with a tower crane, it will be appreciated that it can be implemented with other types of cranes, such as luffing cranes.

Figure 1:
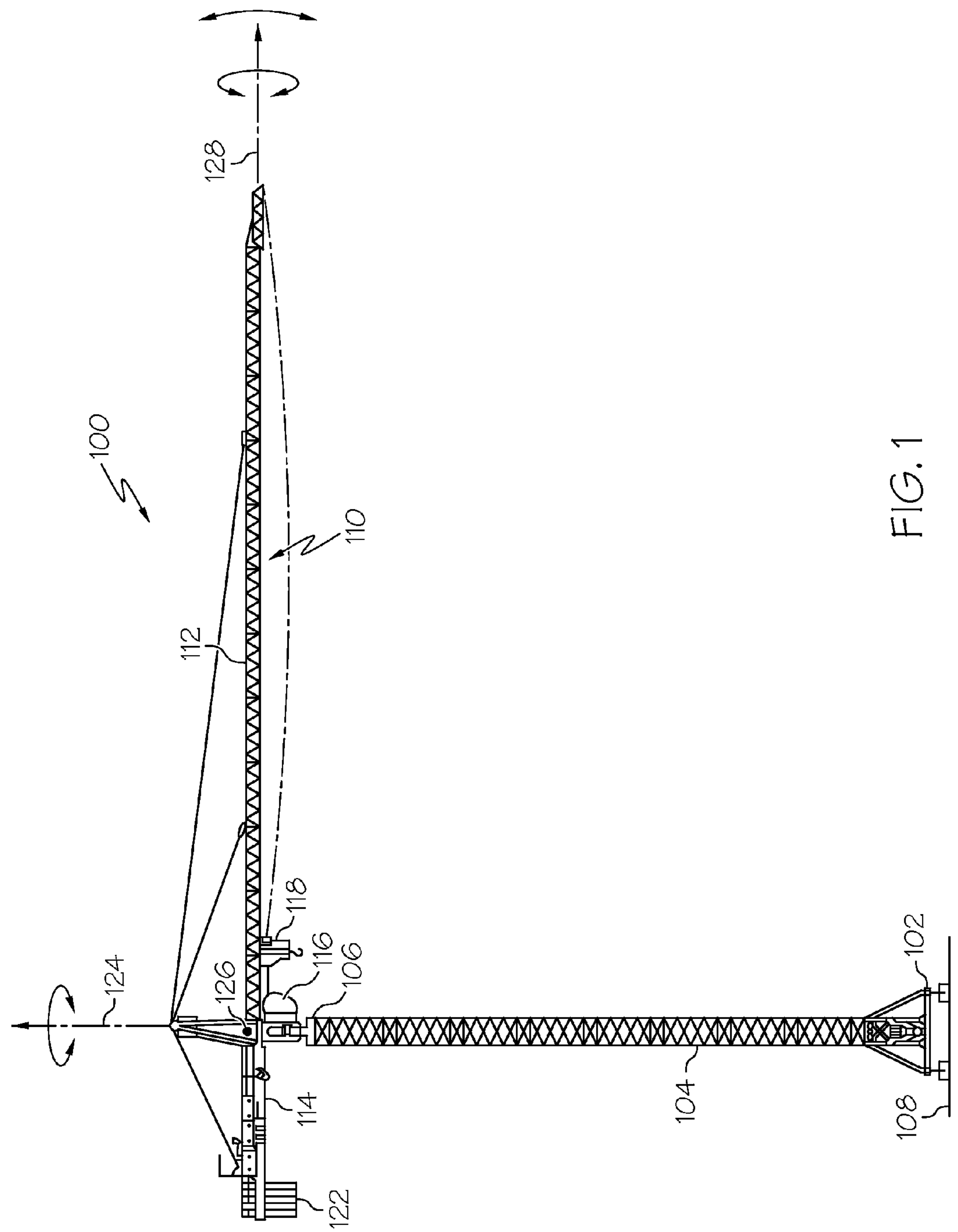
FIG. 1 depicts a side view of an embodiment of a tower crane.

Referring first to FIG. 1, a side view of one embodiment of a tower crane 100 is depicted. The depicted crane 100 is a tower crane, though any one of numerous other types of cranes could also be used. The depicted crane 100 includes a base 102, a mast 104, and a slewing unit 106. The base is affixed to a surface 108, such as the ground, and is used to support the remainder of the components that comprise the tower crane 100. The mast 104, which may be implemented as an adjustable height mast, is coupled at one end to the base 102. The slewing unit 106 is rotationally coupled to the opposing end of the mast 104, and is additionally coupled to a crane jib structure 110, which includes a load-bearing section 112, a counter jib section 114, and an operator cab 116. Before proceeding further, it is noted that when the term “crane jib” is used herein, it encompasses: the entire crane jib structure 110, the load-bearing section 112 and the counter jib section 114, just the load-bearing section 112, or just the counter jib section 114.

The load-bearing section 112, which in the depicted embodiment comprises a plurality of lattice-structure elements, is coupled at one end to the slewing unit 106 and extends therefrom to a second end. A cable trolley 118 may be mounted on the load-bearing section 112 and may be controllably moved to a plurality of positions between the ends of the load-bearing section 112. The counter jib section 114 is coupled to the slewing unit 106 on a side opposite the load-bearing section 112, and has a counter weight 122 coupled thereto. The operator cab 116 is coupled to the slewing unit 106 and, at least in the depicted embodiment, is located under the load-bearing section 112.

An operator, disposed within the operator cab 116, controls the tower crane 100. In particular, an operator, via a plurality of non-illustrated motors and gear sets, may rotate the slewing unit 106, and thus the crane jib, relative to the mast 104, about a first orthogonal axis 124. The dynamics of the crane jib during operation, as well as the environmental conditions, may additionally cause the crane jib to rotate about a second orthogonal axis 126 (depicted as a dot to represent an axis into and out of the plane of the paper), and a third orthogonal axis 128. As used herein, rotation about the first orthogonal axis 124 varies the heading angle of the crane jib, rotation about the second orthogonal axis 126 varies the pitch angle of the crane jib, and rotation about the third orthogonal axis 128 varies the roll angle of the crane jib.

Figure 2:
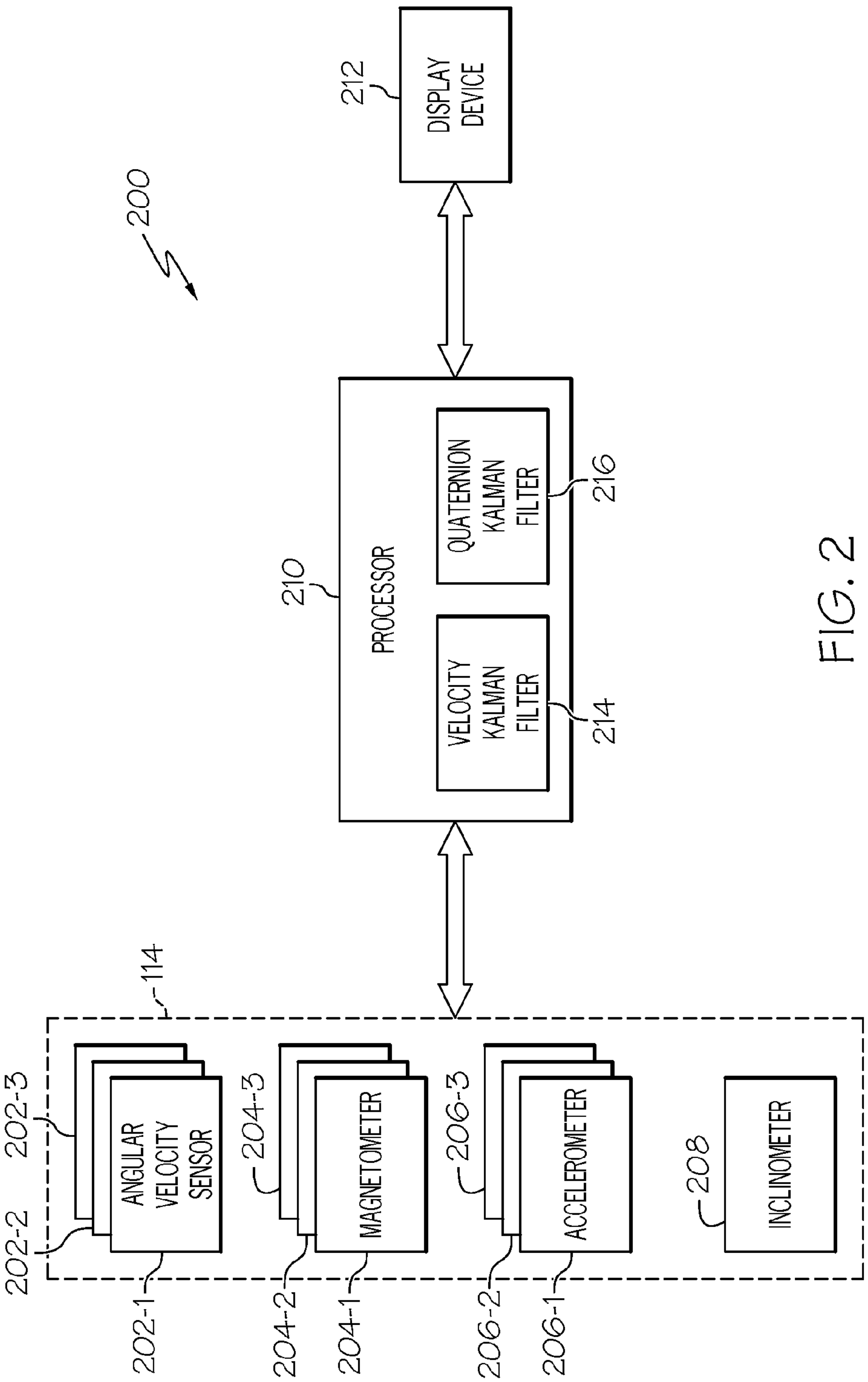
FIG. 2 depicts a functional block diagram of a crane jib attitude and heading reference system (AHRS) that may be used in the tower crane of FIG. 1.

The tower crane 100 may, in some instances, be operated in relatively close proximity with one or more other, non-illustrated tower cranes. Thus, to even further reduce the likelihood that the crane jib 110 will collide with that of another tower crane, the depicted tower crane 100 is additionally equipped with a crane jib attitude and heading reference system (AHRS). An exemplary embodiment of the crane jib AHRS 200 is depicted in FIG. 2 and with reference thereto will now be described.

The depicted crane jib AHRS 200 includes a plurality of crane jib angular velocity sensors 202 (202-1, 202-2, 202-3), a plurality of magnetometers 204 (204-1, 204-2, 204-3), a plurality of accelerometers 206 (206-1, 206-2, 206-3), an inclinometer 208, a processor 210, and a display device 212. The crane jib angular velocity sensors 202 are each configured to sense the angular velocity of the crane jib, and supply angular velocity signals representative thereof. The magnetometers 204 are each configured to sense the local magnetic field at least proximate the crane jib, and supply magnetometer signals representative thereof. More specifically, the magnetometers 204 provide a measurement of the local magnetic field vector resolved along the orientations of the measurement axes. Because the magnetometers 204 are attached to the crane jib 110, the magnetometers 204 and the crane jib 110 have a fixed relative orientation. Hence, the orientation of the magnetometers 204 is directly correlative to that of the crane jib 110. The accelerometers 206 are each configured to sense forces acting on a proof mass (not depicted), and supply specific force signals representative thereof. The inclinometer 208 is configured to sense the roll angle and the pitch angle of the crane jib, and supply inclinometer signals representative thereof.

It will be appreciated that the number and type of crane jib angular velocity sensors 202, the number and type of magnetometers 204, and the number and type of accelerometers 206, may vary. In the depicted embodiment, however, the crane jib angular velocity sensors 202 are implemented using three, orthogonally disposed rate gyroscopes (“gyros”), the magnetometers 204 are implemented using three, orthogonally disposed magnetometers, and the accelerometers 206 are implemented using three, orthogonally disposed accelerometers. Although the specific type of rate gyros 202, magnetometers 204, accelerometers 206, and inclinometer 208 that are used may also vary, in one particular embodiment, an HG1171 Inertial Measurement Unit (IMU) manufactured by Honeywell International, Inc., and which includes all of these devices in a single housing, is used. It will be appreciated that in other embodiments, separately housed sensors may be used.

No matter the specific implementation of the crane jib angular velocity sensors 202, the magnetometers 204, the accelerometers 206, and the inclinometer 208, the processor 210 is coupled to receive the angular velocity signals, the magnetometer signals, the specific force signals, and the inclinometer signals, respectively, therefrom. The processor 210 is configured, in response to these signals to determine the attitude and heading angle of the crane jib. The processor 210 additionally supplies image rendering display commands to the display device 212. The image rendering display commands cause the display device 212 to render the determined crane jib attitude and heading angle thereon.

Before proceeding further, it should be noted that the display device 212 may be implemented using any one of numerous known display devices suitable for rendering image and/or text data in a format viewable by a crane operator. Non-limiting examples of such display devices include various cathode ray tube (CRT) displays, and various flat panel displays such as, various types of LCD (liquid crystal display) and TFT (thin film transistor) displays, just to name a few.

The processor 210 is configured to implement various functions in order to determine the attitude and heading angle of the crane jib from the angular velocity signals, the magnetometer signals, the specific force signals, and the inclinometer signals. In particular, and as FIG. 2 further depicts, the processor 210 implements two Kalman filters—a first Kalman filter 214 and a second Kalman filter 216. As will be described in more detail below, the first Kalman filter 214, which is referred to herein as a velocity Kalman filter, computes predictions of the velocity of the crane jib, and predictions of accelerometer bias. The measurement vector for the velocity Kalman filter 214 is the velocity of the crane jib, which is computed from corrected angular velocity measurements. The computed velocity of the crane jib 110 is also used to compute the acceleration of the crane jib 110, which is used to correct the roll angle and pitch angle sensed by the inclinometer. The second Kalman filter 216, which is referred to herein as the quaternion Kalman filter, computes predictions of angular velocity sensor bias, and determines the attitude and heading angle of the crane jib. The measurement vector for the quaternion Kalman filter 216 comprises the above-mentioned corrected crane jib roll and the pitch angles, and crane jib heading angle that is determined from the magnetometer signals. It should be noted that crane jib heading angle is the heading angle relative to the initial angular orientation of the crane jib.

As is generally known, a Kalman filter implements an iterative two-step prediction-correction process to estimate a state vector. The prediction portion of this process is sometimes referred to as “the time update” because differential equations (e.g., a dynamic model) that govern the state vector are propagated forward in time. The computational resultants from the prediction portion of the process may be referred to as a priori estimates of the state vector. The correction portion of this process is sometimes referred to as “the measurement update” because a measurement vector is used to correct the a priori estimates of the state vector that are computed in the prediction step. The computational resultants from the correction portion of the process may be referred to as posterior estimates of the state vector.

The crane jib AHRS 200, as was just noted, includes two Kalman filters 214, 216. The two Kalman filters 214, 216 operate together. Thus, the overall process implemented in processor 210 includes two prediction steps and two correction steps. Moreover, the depicted Kalman filters 214, 216 are configured such that a measurement vector drives the prediction steps and the correction steps. The overall process 300 implemented in the processor 210 is depicted in flowchart form in FIG. 3, and comprises the following iterative steps: predictions by the velocity Kalman filter 214 (302), predictions by the quaternion Kalman filter 216 (304), corrections by the velocity Kalman filter 214 (306), various intermediate calculations (308), and corrections by the quaternion Kalman filter 304 (310). Because the process is iterative, these process steps are performed sequentially over and over again.

Figure 3:
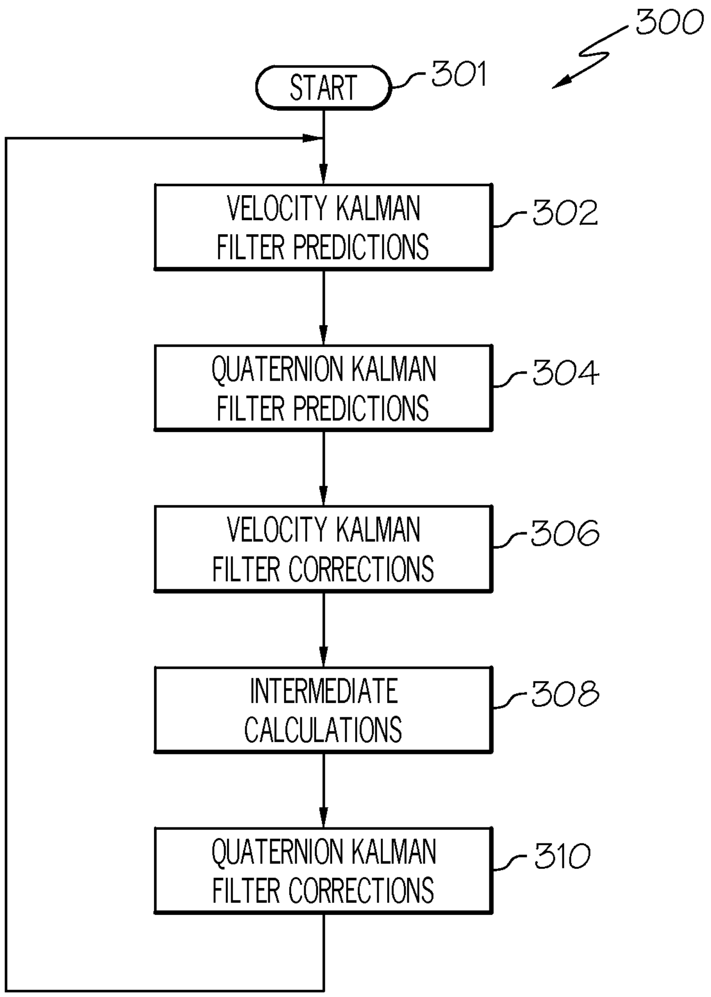
FIG. 3 depicts a process, in flowchart form, that is implemented by the crane jib AHRS of FIG. 2.
Figure 4:
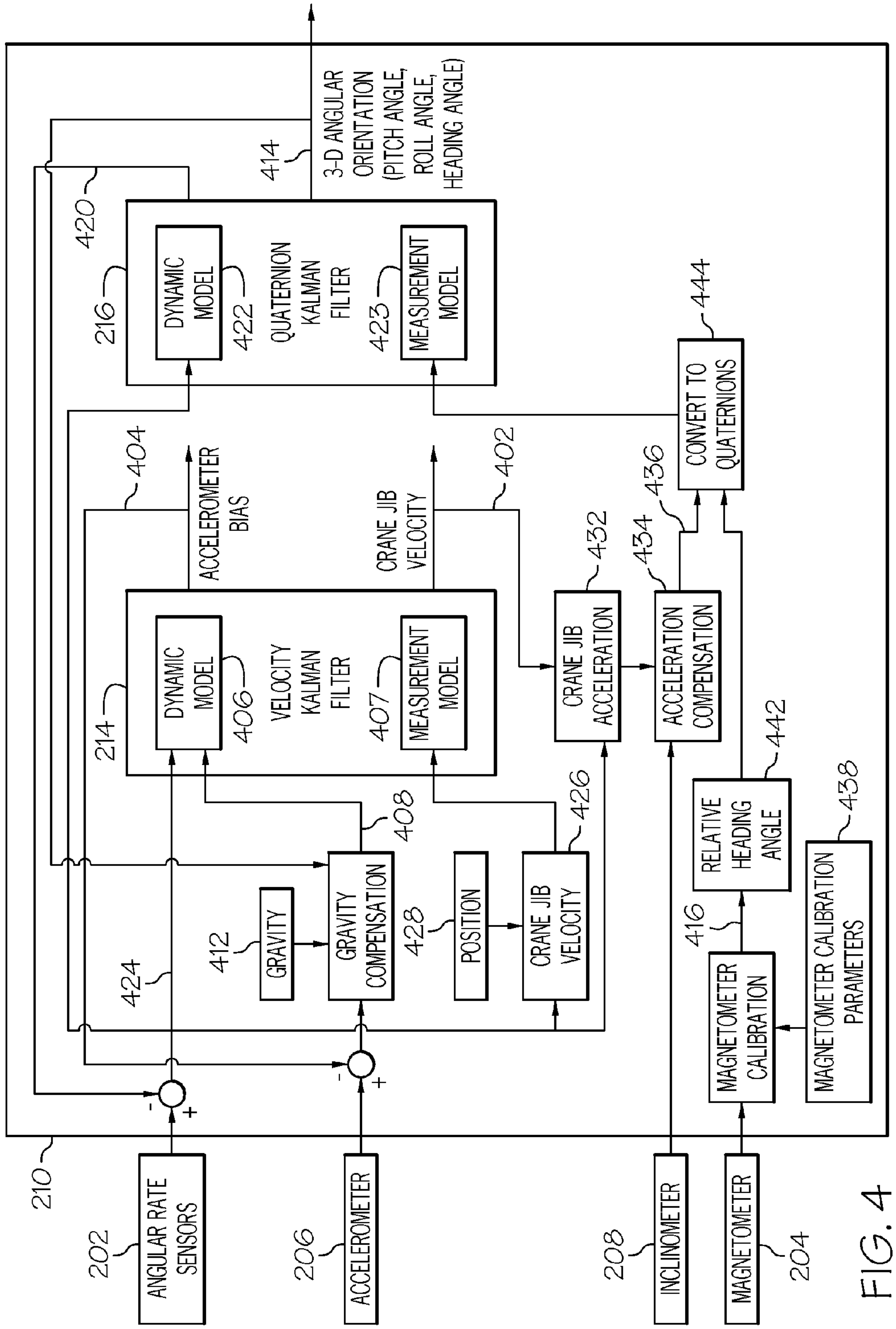
FIG. 4 depicts the crane jib AHRS of FIG. 2 with various functions implemented within the processor, when carrying out the process of FIG. 3, depicted in more detail.

With reference now to FIG. 4, which depicts various functions implemented within the processor 210 in more detail, the process depicted in FIG. 3 and described generally above will now be described in more detail. The velocity Kalman filter prediction step (302) is performed first. During this step, the velocity Kalman filter 214 computes predictions of crane jib velocity 402, and predictions of accelerometer bias 404. These predictions are computed using a dynamic model 406, which is described in more detail below. The measurements used to drive the velocity Kalman filter prediction step (302) are compensated angular velocity measurements 424 and compensated accelerometer measurements 408. The compensated angular velocity measurements are the angular velocity signals supplied from the angular velocity sensors 202 that have been compensated by the angular velocity sensor bias 420 (e.g., the posterior estimate from the previous time step). The compensated accelerometer measurements 408 are accelerometer signals supplied from the accelerometers 206 that have been compensated for accelerometer bias 404 (e.g., the posterior estimate from the previous time step) and gravity 412.

During the quaternion Kalman filter prediction step (304), the quaternion Kalman filter 216 computes predictions of crane jib 3D angular orientation 414 (pitch angle, roll angle, and heading angle), and predictions of angular velocity sensor bias 420. These predictions are also computed using a dynamic model 422, which is also described in more detail below. The measurements used to drive the quaternion Kalman filter prediction step (304) are compensated angular velocity measurements 424.

The velocity Kalman filter correction step (306) is driven using a computed crane jib velocity 426, which is supplied to a measurement model 407. The measurement model 407, like the dynamic model 406, will be described further below. The crane jib velocity 426 that is supplied to the measurement model 407 is computed from corrected angular velocity measurements 424 and the known position 428 (on the crane jib 110) of the angular velocity sensors 202. As was just noted, the corrected angular velocity measurements 424 are computed using the angular velocity signals supplied from the angular velocity sensors 202 and the posterior estimates of the angular velocity sensor bias 420. It is additionally noted that the predictions of crane jib velocity 402 and accelerometer bias 404 that are computed after the velocity Kalman filter correction step (302) are the posterior estimates of crane jib velocity 402 and accelerometer bias 404.

During the intermediate calculations step (308), several intermediate calculations are performed. These calculations include computing crane jib acceleration 432 using the posterior estimate of crane jib velocity 402 and the corrected crane jib angular velocity measurements 424 (computed using the posterior estimate of angular velocity sensor bias 420). Acceleration compensation 434 is applied to the inclinometer signals supplied from the inclinometer 208 using the computed crane jib acceleration 432. This compensation removes crane jib acceleration components from the sensed crane jib roll angle and the sensed crane jib pitch angle, to thereby supply corrected crane jib roll angle measurements and corrected crane jib pitch angle measurements 436. Magnetometer calibration parameters 438 are applied to the magnetometer signals supplied from the magnetometers 204, to thereby generate calibrated magnetometer measurements 416. The calibration parameters 438 may be determined during an initial alignment procedure. The heading angle 442 of the crane jib 110 (relative to its initial angular orientation) is then calculated using the calibrated magnetometer measurements 416. The corrected crane jib roll angle and pitch angle measurements 436 and the heading angle 442 are then converted to quaternions 444 and supplied to the quaternion Kalman filter 216. It should be noted that conversion to, and subsequent use of, quaternions is just one technique that may be used to parameterize 3D angular orientation, and that numerous other attitude parameterization methods may be used. Some non-limiting examples include Euler angles, Rodrigues parameters, and direction cosines, just to name a few.

After the intermediate calculations step (308), the quaternion Kalman filter correction step (310) is performed. This step is driven using the corrected roll angle and pitch angle 434 that are computed from the inclinometer signals, and the heading angle 442 computed from the calibrated magnetometer measurements 438 (and that were converted to quaternions 444). These values are supplied to a measurement model 423, which will also be described further below. The posterior estimates of crane jib 3D angular orientation 414 (e.g., roll angle, pitch angle, and heading angle), and angular velocity sensor bias 420 are computed. The posterior estimates of crane jib 3D angular orientation 414 are used to generate image rendering display commands, which are supplied to the display device 212. The display device 212, as previously noted, renders an image of the crane jib attitude and heading angle.

It was noted in the discussion above that the dynamic models 406 and 422 in the velocity Kalman filter 214 and the quaternion Kalman filter 216, respectively, would be described, as would the measurement models 407 and 423 in the velocity Kalman filter 214 and the quaternion Kalman filter 216, respectively. For completeness, these descriptions will now be provided. Beginning first with the velocity Kalman filter 214, the dynamic model it implements is mathematically represented as follows:

$$\begin{bmatrix}\vec{v}_{sensor}\\ \vec{b}_{f1}\end{bmatrix} = \begin{bmatrix} -(\vec{\omega}_m - \vec{b}_g - \vec{n}_g)^x & -I \\ 0 & -\frac{1}{\tau_a} I\end{bmatrix}\begin{bmatrix}\vec{v}_{sensor}\\ \vec{b}_{f1}\end{bmatrix} + \begin{bmatrix} I\\ 0\end{bmatrix}(\vec{f}_m - \vec{b}_{f0} + C_{bN}\vec{g}) + \begin{bmatrix}-I & 0\\ 0 & I\end{bmatrix}\begin{bmatrix}\vec{n}_f\\ \vec{n}_{f1}\end{bmatrix}$$

$$Q_{v,w} = \mathrm{diag}\left[\sigma_{fx}^2 \quad \sigma_{fy}^2 \quad \sigma_{fz}^2 \quad \frac{2\sigma_{f1x}^2}{\tau_a} \quad \frac{2\sigma_{f1y}^2}{\tau_a} \quad \frac{2\sigma_{f1z}^2}{\tau_a}\right],$$

where $\vec{v}_{sensor}$ is the velocity vector of the sensor, $\vec{\omega}_m$ is the measured angular velocity vector of the crane jib, $\vec{f}_m$ the measured specific force vector of the crane jib, $\vec{g}$ is the local gravity vector, $\vec{b}_g$ is the rate gyro bias vector, $\vec{n}_g$ is the rate gyro measurement noise vector, $\vec{b}_f$ is the accelerometer bias vector, $\vec{b}_{f0}$ is the accelerometer bias null shift vector, $\vec{b}_{f1}$ is the accelerometer bias drift rate vector, $\vec{n}_f$ is the accelerometer measurement noise vector, $\vec{n}_{f1}$ is the accelerometer bias Gauss-Markov driving-process noise vector, $\sigma_f$ is the standard deviation of the accelerometer measurement noise, $\sigma_{f1}$ is the standard deviation of the accelerometer bias Gauss-Markov driving-process noise, $\tau_a$ is the correlation time of the accelerometer bias Gauss-Markov process, $Q_{v,w}$ is the power spectral density of the velocity Kalman filter process noise vector defined by the accelerometer measurement noise vector and the accelerometer bias Gauss-Markov driving-process noise vector, and $C_{bN}$, is the direction cosine matrix from the crane jib navigation frame to the sensor body frame.

And the measurement model implemented by the velocity Kalman filter 214 is mathematically represented as follows:

$$(\vec{\omega}_m - \vec{b}_g)^x \vec{r}_{sensor} = [\,I \quad 0\,]\begin{bmatrix}\vec{v}_{sensor}\\ \vec{b}_{f1}\end{bmatrix} - (\vec{r}_{sensor})^x \vec{n}_g$$

$$R_v = (\vec{r}_{sensor})^x \mathrm{diag}[\,\sigma_{gx}^2 \quad \sigma_{gy}^2 \quad \sigma_{gz}^2\,](\vec{r}_{sensor})^{xT} + (1e-6)I,$$

where, in addition to those variables previously defined, $\vec{r}_{sensor}$ is the position vector of the sensor relative to crane jib's center of rotation, $\sigma_g$ is the standard deviation of the rate gyro measurement noise, and $R_v$ is the covariance matrix of the crane jib angular velocity computed from the compensated angular velocity measurements and sensor position vector.

The dynamic model implemented in the quaternion Kalman filter 216 is mathematically represented as follows:

$$\begin{bmatrix}\delta\vec{q}(t)\\ \vec{b}_{g1}(t)\end{bmatrix} = \begin{bmatrix} -(\vec{\omega}_m - \vec{b}_g)^x & -\frac{1}{2}I \\ 0 & -\frac{1}{\tau_g} I\end{bmatrix}\begin{bmatrix}\delta\vec{q}(t)\\ \vec{b}_{g1}(t)\end{bmatrix} + \begin{bmatrix}-\frac{1}{2}I & 0\\ 0 & I\end{bmatrix}\begin{bmatrix}\vec{n}_g(t)\\ \vec{n}_{g1}(t)\end{bmatrix}$$

$$Q_{q,w} = \mathrm{diag}\left[\sigma_{gx}^2 \quad \sigma_{gy}^2 \quad \sigma_{gz}^2 \quad \frac{2\sigma_{g1x}^2}{\tau_g} \quad \frac{2\sigma_{g1y}^2}{\tau_g} \quad \frac{2\sigma_{g1z}^2}{\tau_g}\right],$$

where, in addition to those variables previously defined, $\delta\vec{q}$ is the vector error component of the estimated quaternion, $\vec{b}_{g0}$ is the rate gyro bias null shift vector, $\vec{b}_{g1}$ is the rate gyro bias drift rate vector, $\vec{n}_{g1}$ is the rate gyro bias Gauss-Markov driving-process noise vector, $\sigma_{g1}$ is the standard deviation of the rate gyro bias Gauss Markov driving-process noise, $\tau_g$ is the correlation time of the rate gyro bias Gauss Markov process, and $Q_{q,w}$ is the power spectral density of the quaternion Kalman filter process noise vector defined by the rate gyro measurement noise vector and the rate gyro bias Gauss-Markov driving-process noise vector.

And the measurement model implemented by the quaternion Kalman filter 216 is mathematically represented as follows:

$$-q_4\hat{\bar{q}} + \bar{q}^x\hat{\bar{q}} + \hat{q}_4\bar{q} = \begin{bmatrix} I & 0 \end{bmatrix}\begin{bmatrix} \delta\bar{q}(t) \\ \vec{b}_{g1}(t) \end{bmatrix}$$

$$R_q = \mathrm{diag}\left[\left[\frac{\sigma_{inc,x}}{2}\right]^2 \quad \left[\frac{\sigma_{inc,y}}{2}\right]^2 \quad \left[\frac{\sigma_{mag}}{2}\right]^2\right],$$

where, in addition to those variables previously defined, $\hat{\vec{q}}$ is the vector component of the estimated quaternion, $\hat{q}_4$ is the scalar component of the estimated quaternion, $\vec{q}$ is the vector component of the quaternion computed from the corrected roll angle and pitch angle 434 that are computed from the inclinometer signals, and the relative heading angle 442 computed from the calibrated magnetometer measurements 438, $q_4$ is the scalar component of the quaternion computed from the corrected roll angle and pitch angle 434 that are computed from the inclinometer signals, and the relative heading angle 442 computed from the calibrated magnetometer measurements 438, $\sigma_{inc_x}$ is the standard deviation of the roll angle inclinometer measurement, $\sigma_{inc_y}$ is the standard deviation of the pitch angle inclinometer measurement, $\sigma_{mag}$ is the standard deviation of the heading angle measurement computed from the calibrated magnetometer measurements 438, and $R_q$ is the covariance matrix of the crane jib attitude and heading angle measurements computed from the corrected roll angle and pitch angle 434 that are computed from the inclinometer signals, and the relative heading angle 442 computed from the calibrated magnetometer measurements 438.

The crane jib attitude and heading reference system and method disclosed herein may be used to determine the attitude and heading angle of a crane jib. If the disclosed system is installed in other cranes, the same information may be provided from other crane jibs working at a particular site. The crane jib attitude and heading reference system differs from other attitude and heading reference systems in that it implements a two-stage Kalman filter (e.g., velocity Kalman filter 214 and quaternion Kalman filter 216) to estimate crane jib attitude and heading angle, crane jib velocity is estimated to remove acceleration components from the accelerometer measurements thereby correcting inclinometer measurements, and measurements of crane jib velocity are based on the dynamics of the crane jib.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of determining the attitude and heading angle of a crane jib, comprising the steps of:

sensing crane jib angular velocity;

sensing crane jib roll angle;

sensing crane jib pitch angle;

sensing specific force acting on a portion of the crane jib;

sensing local magnetic field at least proximate the crane jib;

supplying the sensed crane jib angular velocity, the sensed crane jib roll angle, the sensed crane jib pitch angle, the sensed specific force, and the sensed local magnetic field to a processor; and in the processor:

computing crane jib translational velocity from the sensed crane jib angular velocity and the sensed specific force;

computing crane jib acceleration using the computed crane jib translational velocity and the sensed crane jib angular velocity;

using the computed crane jib acceleration to remove crane jib acceleration components from the sensed crane jib roll angle and the sensed crane jib pitch angle, and to thereby supply corrected crane jib roll angle measurements and corrected crane jib pitch angle measurements;

applying calibration parameters to the sensed local magnetic field, to thereby supply calibrated magnetic field measurements;

computing crane jib heading angle from the calibrated magnetic field measurements; and using the corrected crane jib roll angle measurements, the corrected crane jib pitch angle measurements, and the computed crane jib heading angle, to estimate the attitude and heading angle of the crane jib.

2. The method of claim 1, further comprising:

computing a crane jib angular velocity sensor bias;

computing corrected crane jib angular velocity measurements from the sensed crane jib angular velocity and the crane jib angular velocity sensor bias.

3. The method of claim 2, wherein crane jib velocity is calculated using the corrected crane jib angular velocity measurements.

4. The method of claim 2, wherein:

crane jib angular velocity is sensed using three orthogonally disposed rate gyros;

the rate gyros are each located at a position on the crane jib; and crane jib velocity is computed using the corrected crane jib angular velocity measurements and the position of each of the rate gyros.

5. The method of claim 1, further comprising:

in the processor:

computing bias corrections; and compensating the sensed specific force using the bias corrections and gravity, to thereby supply compensated specific force measurements.

6. The method of claim 5, wherein:

the specific force acting on the crane jib is sensed using three orthogonally disposed accelerometers to sense the sum of forces acting on a proof mass; and the step of computing the bias corrections comprises computing accelerometer bias corrections.

7. The method of claim 1, further comprising:

converting each of the corrected crane jib roll angle measurements, the corrected crane jib pitch angle measurements, and the computed crane jib heading angle to an attitude parameterization; and estimating the attitude and heading angle of the crane jib using the attitude parameterization.

8. The method of claim 1, wherein roll angle and pitch angle are both sensed using one or more of an inclinometer and an accelerometer.

9. The method of claim 1, wherein the local magnetic field at least proximate the crane jib is sensed using three orthogonally disposed magnetometers.

10. The method of claim 1, further comprising rendering the attitude and heading angle of the crane jib on a display device.

11. A crane jib attitude and heading reference system, comprising:

a plurality of crane jib angular velocity sensors, each crane jib angular velocity sensor configured to sense crane jib angular velocity and supply angular velocity signals representative thereof;

a plurality of specific force sensors configured to sense specific forces acting on the crane jib and supply specific force sensor signals representative thereof;

an inclinometer configured to sense crane jib roll angle and crane jib pitch angle and supply inclinometer signals representative thereof;

a plurality of magnetometers, each magnetometer configured to sense local magnetic field at least proximate the crane jib and supply magnetometer signals representative thereof; and a processor coupled to receive the angular velocity signals, the specific force sensor signals, the inclinometer signals, and the magnetometer signals and configured, in response thereto, to:

compute crane jib translational velocity from the sensed crane jib angular velocities and the sensed specific forces;

compute crane jib acceleration using the computed crane jib translational velocity and the sensed crane jib angular velocities;

use the computed crane jib acceleration to remove crane jib acceleration components from the sensed crane jib roll angle and the sensed crane jib pitch angle, and to thereby supply corrected crane jib roll angle measurements and corrected crane jib pitch angle measurements;

apply calibration parameters to the sensed local magnetic fields, to thereby supply calibrated magnetic field measurements;

compute crane jib heading angle from the calibrated magnetic field measurements; and using the corrected crane jib roll angle measurements, the corrected crane jib pitch angle measurements, and the computed crane jib heading angle, to estimate the attitude and heading angle of the crane jib.

12. The system of claim 11, further comprising:

a display device coupled to the processor, the display device configured to render thereon the attitude and heading angle of the crane jib.

13. The system of claim 11, wherein the processor is further configured to:

compute a crane jib angular velocity sensor bias correction; and compute corrected crane jib angular velocity measurements from the sensed crane jib angular velocities and the crane jib angular velocity sensor bias correction.

14. The system of claim 12, wherein the processor calculates crane jib velocity using the corrected crane jib angular velocity measurements.

15. The system of claim 12, wherein:

the plurality of crane jib angular velocity sensors comprises three orthogonally disposed rate gyros, each rate gyro located at a position on the crane jib; and the processor computes crane jib velocity using the corrected crane jib angular velocity measurements and the position of each of the rate gyros.

16. The system of claim 11, wherein the processor is further configured, in response to the specific force sensor signals to:

compute bias corrections, and compensate the sensed specific forces using the bias corrections and gravity, to thereby supply compensated specific force measurements.

17. The system of claim 16, wherein:

the specific force sensors comprise three orthogonally disposed accelerometers configured to sense the sum of forces acting on a proof mass; and the bias corrections comprise accelerometer bias corrections.

18. The system of claim 11, wherein the processor is further configured to:

convert each of the corrected crane jib roll angle measurements, the corrected crane jib pitch angle measurements, and the computed crane jib heading angle to quaternions; and estimate the attitude and heading angle of the crane jib using the quaternions.

19. The system of claim 11, wherein the plurality of magnetometers comprises three orthogonally disposed magnetometers.

20. A crane jib attitude and heading reference system, comprising:

a plurality of crane jib angular velocity sensors, each crane jib angular velocity sensor configured to sense crane jib angular velocity and supply angular velocity signals representative thereof;

an inclinometer configured to sense crane jib roll angle and crane jib pitch angle and supply inclinometer signals representative thereof;

a plurality of accelerometers, each accelerometer configured to sense forces acting on a proof mass and supply specific force sensor signals representative thereof;

a plurality of magnetometers, each magnetometer configured to sense local magnetic field at least proximate the crane jib and supply magnetometer signals representative thereof;

a display device; and a processor coupled to the display device and further coupled to receive the angular velocity signals, the inclinometer signals, the specific force signals, and the magnetometer signals, the processor configured, upon receipt of the angular velocity signals, the inclinometer signals, specific force signals, and the magnetometer signals, to:

compute corrected accelerometer measurements using the sensed forces acting on the proof mass, gravity, and predictions of accelerometer bias;

compute corrected angular velocity measurements using the sensed angular velocity and predictions of angular velocity sensor bias;

compute estimates of crane jib translational velocity using the corrected angular velocity measurements and compensated accelerometer measurements;

compute corrected crane jib roll and pitch angles from the inclinometer signals and the estimates of crane jib translational velocity;

compute crane jib heading angle from the magnetometer signals;

implement a first filter that receives the computed estimates of crane jib velocity, computes predictions of crane jib velocity, and computes the predictions of accelerometer bias;

implement a second filter that receives the computations of corrected crane jib roll and pitch angles and the computations of crane jib heading angle, computes the predictions of angular velocity sensor bias, and determines crane jib attitude and heading angle; and supply image rendering display commands to the display device that cause the display device to render the crane jib attitude and heading angle thereon.

* * * * *